(Model.)

J. A. EHLE.
HAY TEDDER.

No. 286,406. Patented Oct. 9, 1883.

WITNESSES:
Donn Twitchell.
C. Sedgwick

INVENTOR:
J. A. Ehle
BY Munn & Co
ATTORNEYS.

UNITED STATES PATENT OFFICE.

JAMES A. EHLE, OF ST. CLOUD, WISCONSIN.

HAY-TEDDER.

SPECIFICATION forming part of Letters Patent No. 286,406, dated October 9, 1883.

Application filed July 7, 1881. (Model.)

*To all whom it may concern:*

Be it known that I, JAMES A. EHLE, of St. Cloud, in the county of Fond du Lac and State of Wisconsin, have invented certain useful Improvements in Hay-Tedders, of which the following is a specification.

Figure 1:
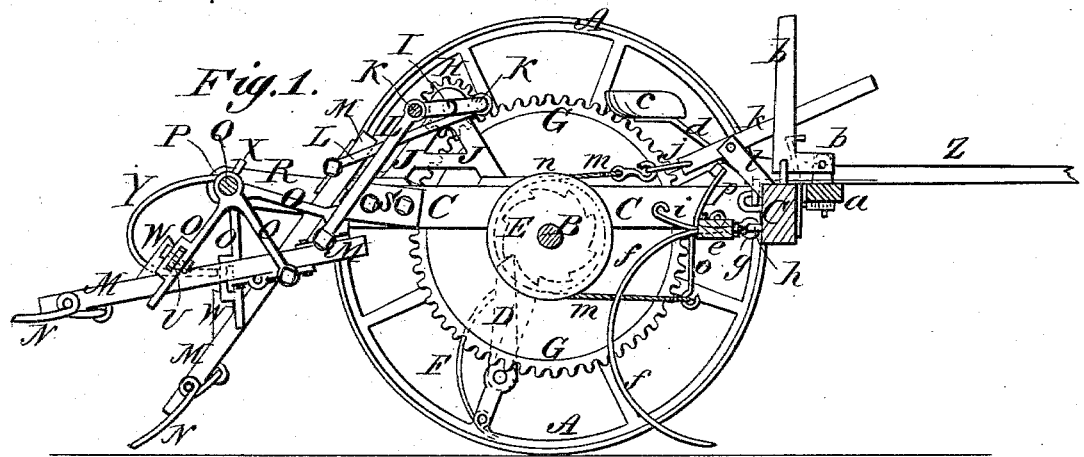
Figure 2:
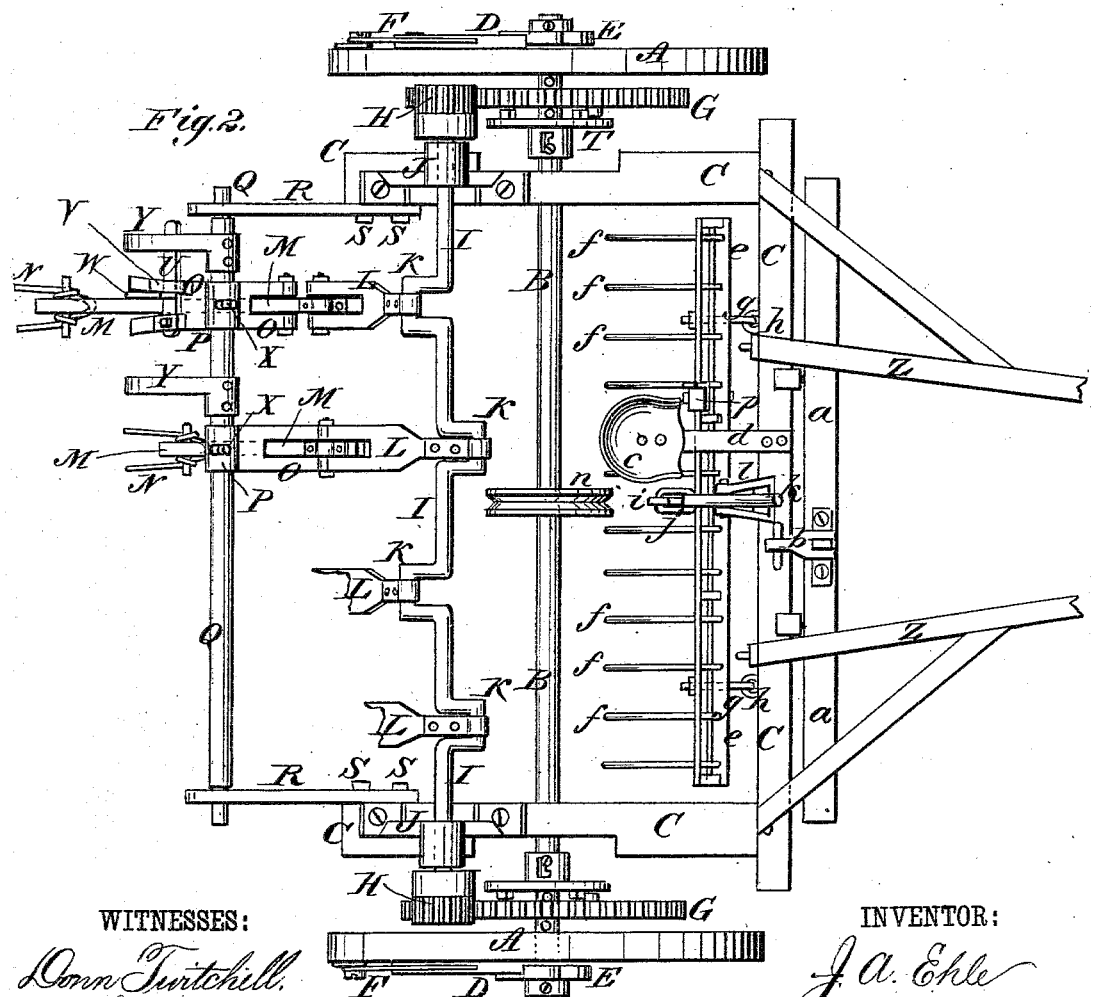

Figure 1 is a sectional side elevation of my improvement. Fig. 2 is a plan view of the same.

Similar letters of reference indicate corresponding parts.

The object of this invention is to facilitate the operation of tedding hay.

The invention consists in the combination, with the carriage, the crank-shaft, and its driving mechanism, and the rear shaft and its supporting-bars, of the pivoted connecting-bars, the hinged fork-handles, and the hinged connections, whereby the forks will be vibrated by the advance of the machine; also, in the combination, with the fork-handles, the supporting-shaft, and the hinged two-armed connections having their rear arms slotted, of the latches, the catches, and the guides, whereby the forks will be made to pass forward above the hay.

A are the wheels, the axle B of which revolves in bearings attached to the lower sides of the side bars of the frame C. The wheels A are made to carry the axle B with them when turned forward by pawls D, which engage with ratchet-teeth E, formed upon the nuts that fasten the wheels upon the said axle, or upon separate wheels attached to the said axle. The pawls D are held against the ratchet-wheels E by springs F, attached to the drive-wheels A, and which press against the said pawls. Upon the axle B, at the inner sides of the wheels A, are placed two large gear-wheels G, which are made to revolve with the said axle B by the clutches T, placed upon the said axle B, and secured in gear and out of gear with the axle B by a set-screw or other suitable means. The teeth of the large gear-wheels G mesh into the teeth of small gear-wheels H, attached to the ends of a shaft, I, which revolves in bearings in brackets J, attached to the side bars of the frame C.

If desired, the gear-wheels G H can be replaced by pulleys and bands, in which case the bands should be crossed, so that the axle B and shaft I will be revolved in opposite directions.

Upon the shaft I are formed a series of cranks, K, which project alternately in opposite directions, as shown in Fig. 2. To the cranks K are pivoted the forward ends of short connecting-bars L, the rear ends of which are forked, and to them are pivoted the forward ends of the fork-handles M. To the rear ends of the handles M are hinged the forks N, the shanks of which are made short, and are secured to the handles M by staples or other suitable means.

O are angular or two-armed connections, which are hinged at the ends of their forward arms to the fork-handles M, at a little distance from the forward ends of the said handles. Upon the connections O, at their angles, are formed, or to them are attached, sockets P, to receive the shaft Q, the ends of which work in bearings in the rear ends of the bars R. The forward ends of the bars R are secured to the rear parts of the side bars of the frame C by bolts S. Several holes should be formed in the bars R to receive the bolts S, so that the said bars R can be adjusted to support the shaft Q at any desired distance from the ground. The rear arm of each of the connections O is slotted to receive the fork-handle M, and has a latch, U, pivoted to one of its branches. The connections O are kept in place upon the shaft Q by pins or screws X, which enter the said shaft through slots in the sockets P, so that the said connections O can have a slight rotary or rocking movement upon the said shaft Q. The latch U works in a keeper, V, attached to the other branch of the rear arm of the connection O. W is a triangular plate, having a notch or slot in its upper edge, to receive the latch U, and which is attached to the fork-handle M in such a position that the latch U, when in the lower part of the keeper V, will enter the notch or slot of the catch-plate W, the inclined edge of said catch-plate guiding the said latch into the slot. When the machine is drawn forward, the crank-shaft I is turned to the rearward or in the opposite direction from the drive-wheels A, and the cranks K and the connecting-rods L cause the forward ends of the fork-handles M to move downward, forward, upward, and rearward, and the rear ends of the fork-handles M to move upward, forward, downward, and rearward. As the rear end of each fork-handle moves upward the catch-plate W engages with the latch U, and the rear end of the said fork-handle is supported by the said latch U and catch-plate W during the forward movement of the said fork-handle, and so long as the latch U is allowed to remain in gear with the catch-plate W.

To the shaft Q, near the free end of the latches U, are attached arms Y, which are curved into such positions that the latches U, as the forks approach the forward end of their movement, will come in contact with them and be raised from the catches W, allowing the forks to drop to the ground to come in contact with the hay. As the forks complete their rearward movement the latches U again engage with the catches W and cause the forks to move forward above the ground and out of contact with the hay.

To the inner side of the forward cross-bar of the frame C are hinged the rear ends of the thills Z, which cross the upper side of the said cross-bar, and are connected with its forward side by cross-bar $a$.

$b$ is a bent or angle lever, which is pivoted at its angle to the upper side of the forward cross-bar, C, of the frame, and at the end of its forward arm to the upper side of the cross-bar $a$. The pivotal connections of the lever $b$ should be loose, to give the necessary play when the said lever is operated. With this construction, when the lever $b$ is operated the forward part of the frame C will be pressed downward, which will raise the rear end of said frame, and thus raise the tedder-forks away from the ground. The lever $b$ can be secured in any position into which it may be adjusted by a catch-bar, bolt, or other device.

The driver's seat $c$ is attached to the upper end of a standard, $d$, the other end of which is secured to the front cross-bar of the frame A.

$e$ is the rake-head, which is provided with curved spring-teeth $f$ in the ordinary manner. The rake-head $e$ is hinged to the front cross-bar of the frame A by hooked or eye rods $g$ and staples $h$, or other suitable means. To the rake-head $e$ is attached a hooked arm, $i$, the outer end of which can be hooked into a link, $j$, hinged to the end of a lever, $k$. The lever $k$ is pivoted at a little distance from its lower end to a slotted standard, $l$, or other support, attached to the front cross-bar of the frame A, so that the driver, by operating the lever $k$, can raise the rake-teeth from the ground to dump the collected hay, to pass obstructions, or for any other desired purpose; or, to the link $j$ can be attached the end of a cord, $m$, which passes around a pulley, $n$, attached to the axle B. The other end of the cord $m$ is attached to the end of an arm, $o$, attached to the rake-head $e$, so that the driver, by operating the lever $k$, can draw the cord $m$ around the pulley $n$ and cause the rake to be raised from the ground by the revolution of the axle B. By gradually slackening the cord $m$ the rake can be gently lowered to the ground.

To the rake-head $e$ is attached the end of a bar, $p$, the free end of which projects into such a position that the driver, when the rake-head is raised from the ground, can place his foot upon the free end of the bar $p$, and thus hold the rake-head raised from the ground when required.

Having thus described my invention, I claim as new and desire to secure by Letters Patent—

1. The combination, with the carriage A B C, the crank-shaft I and its driving mechanism, and the shaft Q and its supporting-bars, of the pivoted bars L, the hinged fork-handles M, and the hinged connections O, substantially as herein shown and described, whereby the forks will be vibrated by the advance of the machine, as set forth.

2. The combination, with the fork-handles M, the supporting-shaft Q, and the hinged two-armed connections O, having their rear arms slotted, of the latches U, the catches W, and the guides Y, substantially as herein shown and described, whereby the forks will be made to pass forward above the ground, as set forth.

JAMES AARON EHLE.

Witnesses:
  C. C. DAVIDSON,
  GEO. P. GOULD.